UNITED STATES PATENT OFFICE.

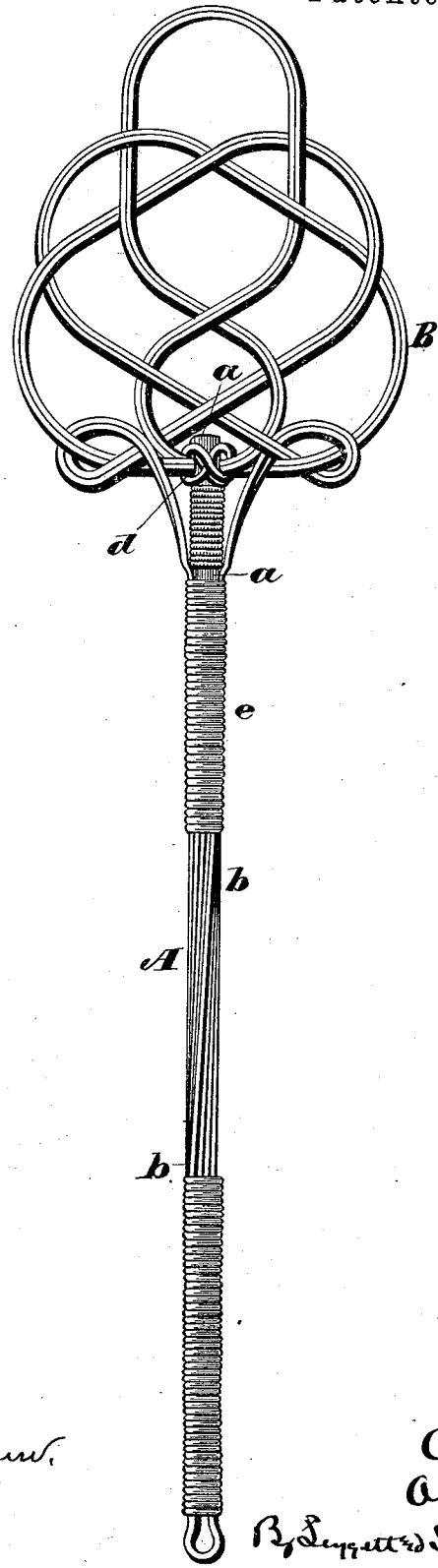

ADOLPH LIST AND OTTO KUNATH, OF CAPE GIRARDEAU, MISSOURI.

CARPET-BEATER.

SPECIFICATION forming part of Letters Patent No. 273,293, dated March 6, 1883.

Application filed November 11, 1882. (No model.)

*To all whom it may concern:*

Be it known that we, ADOLPH LIST and OTTO KUNATH, of Cape Girardeau, in the county of Cape Girardeau and State of Missouri, have invented certain new and useful Improvements in Carpet-Beaters; and we do hereby declare the following to be a full, clear, and exact description of the invention, such as will enable others skilled in the art to which it appertains to make and use the same, reference being had to the accompanying drawing, and to letters of reference marked thereon, which form a part of this specification.

Our invention relates to an improvement in carpet-beaters, the object of the same being to provide a device of this character which will combine simplicity and economy of construction with durability and efficiency in use; and with these ends in view our invention consists in certain details of construction and combinations of parts, as will be more fully described, and pointed out in the claims.

The accompanying drawing represents our invention in front elevation.

This improved beater is made from rattan or any other suitable tough fibrous material, and consists of a handle, A, and the fan-shaped end B, the latter being secured to the former in such a manner as will be hereinafter described. The handle A is composed of a central core, $a$, of rattan or any other tough fibrous material, having longitudinal strips or pieces $b$ of the same material placed lengthwise around the same. The majority of the longitudinal strips $b$ terminate slightly below the upper end of the handle, and are secured thereon by winding strips of rattan or other material spirally around the upper and lower ends of the handle. One or more of the longitudinal strips $b$, on one or both sides of the core $a$, instead of terminating below the upper end of the said core, is continued upward a sufficient distance to form the fan-shaped net-work. We prefer to start to form this net-work or open-work beating end on one side of the core and terminate on the opposite side thereof, the free end or ends of the strips $b$, forming the said open work, being carried downward along side of the core and secured in position by the strip or strips wound spirally around the upper end thereof. The strip or strips forming the beating end of the beater is curved or bent into any suitable design, and is interlocked or interwoven and carried through an opening, $d$, in the end of the core $a$ several times, for the purpose of stiffening the fan-shaped end, and also preventing it from being distorted in shape.

Instead of making our improved beater entirely of rattan, it can be made of rawhide, or any other material which possesses sufficient elasticity and toughness for the purpose in view; or the core can be formed of metal and wound around with the rattan or rawhide, as before set forth.

Our invention is also well applicable for beating mattresses, clothes, matting, &c., and all kinds of upholstered work, without danger or liability of tearing or in any wise injuring the material.

We would have it understood that we do not limit ourselves to the exact construction and design of the fan-shaped end, as we consider ourselves at liberty to make such changes and alterations therein as fairly fall within the spirit and scope of our invention.

Having fully described our invention, what we claim as new, and desire to secure by Letters Patent, is—

1. A carpet-beater consisting of a handle and a beating end, the latter formed of strands of rattan or other suitable tough fibrous material woven or interlocked to form a fan-shaped beating end, said strands or strips being extended along the sides of the handle, and strands coiled around the handle, and strips or strands for securing them in place, substantially as set forth.

2. The combination, with the core of the handle, the longitudinal strips surrounding the core and the fan-shaped beating end, of the strips of fibrous material wound around the longitudinal strips and core for the purpose of securing the parts together, all of the above parts being constructed in the manner set forth.

In testimony that we claim the foregoing we have hereunto set our hands this 6th day of November, 1882.

ADOLPH LIST.
OTTO KUNATH.

Witnesses:
WILLIAM H. COWVER,
LAURA ENGELMANN.